(12) United States Patent
Lee et al.

(10) Patent No.: US 10,381,967 B2
(45) Date of Patent: Aug. 13, 2019

(54) SIMPLIFIED POWER CONVERSION SYSTEMS FOR VEHICLES

(71) Applicant: Toyota Motor Engineering & Manufacturing North America, Inc., Erlanger, KY (US)

(72) Inventors: Jae Seung Lee, Ann Arbor, MI (US); Jongwon Shin, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 279 days.

(21) Appl. No.: 15/597,810

(22) Filed: May 17, 2017

(65) Prior Publication Data
US 2018/0334046 A1 Nov. 22, 2018

(51) Int. Cl.
*B60R 16/03* (2006.01)
*H02P 27/06* (2006.01)
(Continued)

(52) U.S. Cl.
CPC ............ *H02P 27/06* (2013.01); *B60L 50/10* (2019.02); *B60L 53/24* (2019.02); *H02J 7/0068* (2013.01);
(Continued)

(58) Field of Classification Search
CPC .......... B60L 50/10; B60L 53/24; H02M 3/04; H02M 7/04; H02M 7/44; H02M 2001/007;
(Continued)

(56) References Cited

U.S. PATENT DOCUMENTS

| 9,083,195 B2 | 7/2015 | Lewis |
| 2004/0062059 A1 | 4/2004 | Cheng et al. |
| | (Continued) | |

FOREIGN PATENT DOCUMENTS

| CN | 201918962 U | 8/2011 |
| CN | 103057435 B | 8/2016 |
| | (Continued) | |

OTHER PUBLICATIONS

Jungmoon Kim, "A Single-Inductor Eight-Channel Output DC-DC Converter with Time-Limited Power Distribution Control and Single Shared Hysteresis Comparator", IEEE Transactions on Circuits and Systems—I: Regular Papers, vol. 60, No. 12, Dec. 2013, pp. 3354-3367.

(Continued)

*Primary Examiner* — Alfonso Perez Borroto
*Assistant Examiner* — Esayas G Yeshaw
(74) *Attorney, Agent, or Firm* — Dinsmore & Shohl LLP

(57) ABSTRACT

A power conversion system for a vehicle includes a power conditioning device, a boost converter, an inverter coupled to the boost converter, a transformer, a second rectifier coupled to the transformer, an electric motor, a battery coupled to the second rectifier, a first switch configured to selectively connect the boost converter with the power conditioning device or the battery, and a second switch configured to selectively connect the inverter with the transformer or the electric motor. The first switch connects the power conditioning device with the boost converter and the second switch connects the inverter with the transformer in response to the vehicle being in a grid-connected mode, and the first switch connects the battery with the boost converter and the second switch connects the inverter with the electric motor in response to the vehicle being in a stand-alone mode.

20 Claims, 6 Drawing Sheets

(51) Int. Cl.
*H02M 3/04* (2006.01)
*H02M 7/04* (2006.01)
*H02M 7/44* (2006.01)
*H02J 7/00* (2006.01)
*H02M 1/12* (2006.01)
*H02M 1/42* (2007.01)
*H02M 1/44* (2007.01)
*H02M 3/158* (2006.01)
*H02M 7/5387* (2007.01)
*B60L 50/10* (2019.01)
*B60L 53/24* (2019.01)
*H02M 1/00* (2006.01)

(52) U.S. Cl.
CPC ........... *H02M 1/12* (2013.01); *H02M 1/4225* (2013.01); *H02M 1/44* (2013.01); *H02M 3/04* (2013.01); *H02M 3/1588* (2013.01); *H02M 7/04* (2013.01); *H02M 7/44* (2013.01); *H02M 7/53875* (2013.01); *H02M 2001/007* (2013.01)

(58) Field of Classification Search
CPC ........ H02M 1/12; H02M 1/4225; H02M 1/44; H02M 3/1588; H02M 7/53875; H02J 7/0068; H02P 27/06
See application file for complete search history.

(56) References Cited

U.S. PATENT DOCUMENTS

| | | | |
|---|---|---|---|
| 2009/0115251 A1* | 5/2009 | Nakamura | H01M 10/625 307/32 |
| 2011/0080040 A1* | 4/2011 | Kumar | H02J 4/00 307/9.1 |
| 2013/0141070 A1 | 6/2013 | Goessling et al. | |
| 2015/0210152 A1* | 7/2015 | Arkus | B60L 11/1809 180/65.245 |
| 2015/0333544 A1* | 11/2015 | Toya | H01M 10/48 320/112 |
| 2016/0126731 A1* | 5/2016 | Gu | G01R 31/42 324/750.01 |
| 2017/0085106 A1* | 3/2017 | Bai | H02J 7/0052 |

FOREIGN PATENT DOCUMENTS

| | | |
|---|---|---|
| EP | 3124312 A2 | 2/2017 |
| WO | 2012054279 A2 | 4/2012 |

OTHER PUBLICATIONS

M. Chinthavali et al, All-SiC Inductively Coupled Charger with Integrated Plug-in and Boost Functionalities for PEV Applications, Power Electronics and Electric Machinery Group, Oak Ridge, Tennessee, 8 pages.

\* cited by examiner

SIMPLIFIED POWER CONVERSION SYSTEMS FOR VEHICLES

TECHNICAL FIELD

The present disclosure generally relates to simplified power conversion systems for vehicles and, more specifically, to power conversion systems for electrified vehicles or hybrid vehicles that merge duplicative electronic devices into a single electronic device using single-pole double-throw switches.

BACKGROUND

Power conversion systems include various components, e.g., a battery charger, a boost converter, a DC-DC converter, and an inverter, which occupy considerable volume and weight in vehicles (e.g., electrified vehicles including plug-in type and pure electric vehicles, or hybrid vehicles).

Accordingly, a need exists for reducing volume and weight of the power conversion system for the hybrid or electric vehicle.

SUMMARY

In one embodiment, a power conversion system for a vehicle includes a power conditioning device, a boost converter, an inverter coupled to the boost converter, a transformer, a second rectifier coupled to the transformer, an electric motor, a battery coupled to the second rectifier, a first switch configured to selectively connect the boost converter with the power conditioning device or the battery, and a second switch configured to selectively connect the inverter with the transformer or the electric motor. The first switch connects the power conditioning device with the boost converter and the second switch connects the inverter with the transformer in response to the vehicle being in a grid-connected mode, and the first switch connects the battery with the boost converter and the second switch connects the inverter with the electric motor in response to the vehicle being in a stand-alone mode.

According to another embodiment, a method of controlling a power conversion system of a vehicle is provided. The power conversion system includes a power conditioning device, a boost converter, an inverter coupled to the boost converter, a transformer, a second rectifier coupled to the transformer, an electric motor, a battery coupled to the second rectifier, a first switch, and a second switch. The method includes determining whether the vehicle is in a grid-connected mode or a stand-alone mode, in response to the vehicle being in the grid-connected mode: operating the first switch to connect the power conditioning device of the power conversion system with the boost converter of the power conversion system, and operating the second switch to connect the inverter of the power conversion system with the transformer of the power conversion system, and in response to the vehicle being in the stand-alone mode: operating the first switch to connect the battery of the power conversion system with the boost converter, and operating the second switch to connect the inverter with the electric motor of the power conversion system.

According to another embodiment, a vehicle includes a power conversion system. The power conversion system includes a power conditioning device, a boost converter, an inverter coupled to the boost converter, a transformer, a second rectifier coupled to the transformer, an electric motor, a battery coupled to the second rectifier, a first switch configured to selectively connect the boost converter with the power conditioning device or the battery, and a second switch configured to selectively connect the inverter with the transformer or the electric motor. The first switch connects the power conditioning device with the boost converter and the second switch connects the inverter with the transformer in response to the vehicle being in a grid-connected mode. The first switch connects the battery with the boost converter and the second switch connects the inverter with the electric motor in response to the vehicle being in a stand-alone mode.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to power conversion systems for vehicles that the volume and weight of the components over conventional power conversion systems. In one example, a power conversion system includes a power conditioning device, a boost converter, an inverter coupled to the boost converter, a transformer, a second rectifier coupled to the transformer, an electric motor, a battery coupled to the second rectifier, a first switch configured to selectively connect the boost converter with the power conditioning device or the battery, and a second switch configured to selectively connect the inverter with the transformer or the electric motor. The first switch connects the power conditioning device with the boost converter and the second switch connects the inverter with the transformer in response to the vehicle being in a grid-connected mode. The first switch also connects the battery with the boost converter and the second switch connects the inverter with the electric motor in response to the vehicle being in a stand-alone mode. By sharing redundant power conversion stages and eliminating duplicative components, e.g., a boost converter and an inverter, the power conversion system according to the present disclosure reduces the volume and weight of the power conversion system for the vehicle. The present power conversion system shares more than one converter to enhance energy efficiency, reliability and drive range of the vehicle. Various embodiments of power conversion systems for vehicles will be described in further detail herein with specific reference to the appended drawings.

Figure 1A:
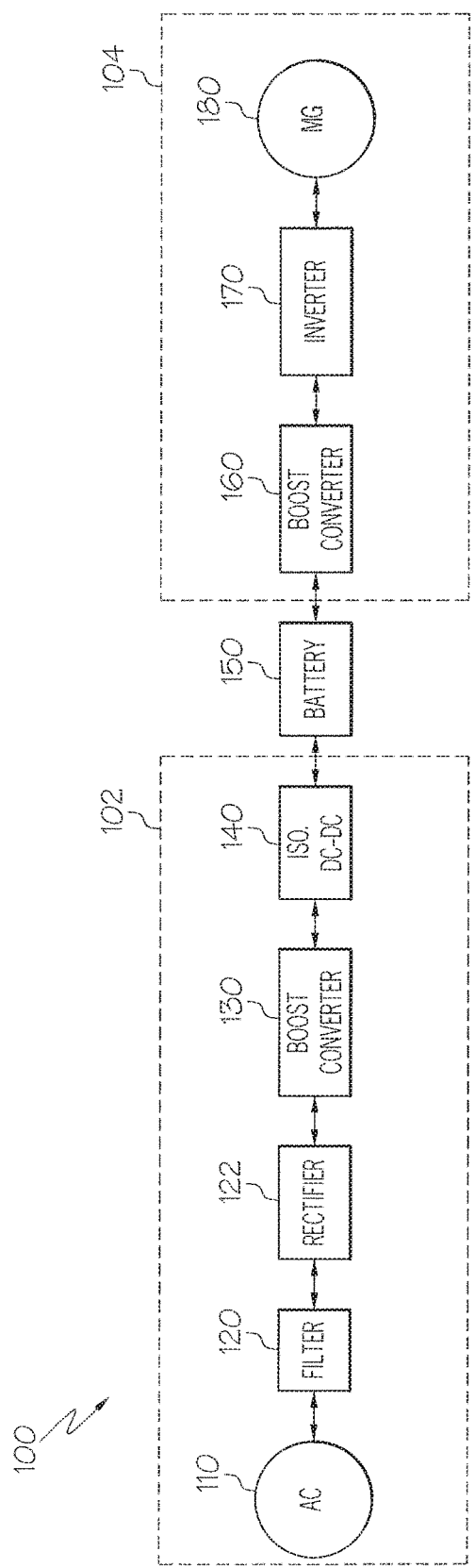
FIG. 1A depicts a schematic diagram of a conventional power conversion system for a vehicle.
Figure 1B:
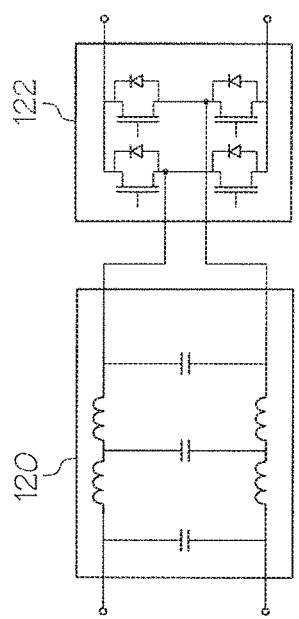
FIG. 1B depicts electric devices of a filter and a rectifier of the conventional power conversion system.

Referring now to FIG. 1A, a schematic diagram of a conventional power conversion system 100 for a vehicle is illustrated. The power conversion system 100 includes an AC source 110, a filter 120, a first rectifier 122, a first boost converter 130, an isolated DC-DC converter 140, a battery 150, a second boost converter 160, an inverter 170, and an electric motor/generator 180. A grid-connected process 102 indicates a process of charging or discharging the battery 150 using the AC source 110. The AC source 110 may be a grid which can be a single-phase or three-phase AC voltage. In some embodiments, the AC source 110 may be an alternator/generator in a vehicle. The filter 120 and the first rectifier 122 may function as a power conditioning device. In some embodiments, the power conditioning device may include different components than the filter 120 and the first rectifier 122. The filter 120 may include common-mode and differential mode filters for electromagnetic interference (EMI)/electromagnetic compatibility (EMC) requirements. As an example and not a limitation, the filter 120 may consist of three capacitors and four inductors as shown in FIG. 1B. The first rectifier 122 may include a diode rectifier bridge. As a non-limiting example, the first rectifier 122 may consist of four diodes as shown in FIG. 1B.

In order to charge the battery 150 in the grid-connected mode, the first boost converter 130 is used to turn ON or OFF a switching device and to boost DC low voltage of the rectified voltage by using stored energy in a reactor to output DC high voltage. The isolated DC-DC converter 140 converts the stepped-up rectified voltage into a refined DC voltage and feeds the refined DC voltage to the battery 150. In order to discharge the battery 150 in the grid-connected mode such as a vehicle-to-grid (V2G) mode, the isolated DC-DC converter 140 steps up the DC voltage of the battery 150 and feeds the stepped-up voltage to the first boost converter 130. The first boost converter 130 translates the stepped-up voltage into a rectified AC voltage and feeds the rectified voltage to the rectifier 122. The rectifier 122 unfolds the rectified AC voltage into AC voltage and feeds the AC voltage to the filter 120 and the AC source 110.

A stand-alone process 104 indicates a process of operating the electric motor/generator 180 by discharging or charging the battery 150. To discharge the battery 150, the second boost converter 160 steps up the DC voltage provided by the battery 150, and provides the stepped-up DC voltage to the inverter 170. The inverter 170 translates the DC voltage from the second boost converter 160 into an AC voltage and provides the AC voltage to the electric motor/generator 180. To charge the battery 150 by, e.g., regenerative braking, the electric motor/generator 180 generates AC voltage and feeds the AC voltage to the inverter 170. The inverter 170 translates the AC voltage into a DC voltage and feeds the DC voltage to the second boost converter 160. The second boost converter 160 steps-down the DC voltage and feeds the stepped-down DC voltage to the battery 150.

Generally, the grid-connected process 102 and the stand-alone process 104 do not occur at the same time. In embodiments where a vehicle is a plug-in electrified vehicle, the grid-connected process 102 occurs when the plug-in electrified vehicle is parked and plugged into an external power supply. While the plug-in electrified vehicle is parked, the stand-alone process 104 does not occur because the battery 150 cannot be charged and discharged at the same time. That is, the battery 150 transfers no electric power to the electric motor/generator 180 while the plug-in electrified vehicle is parked and charged. The stand-alone process 104 occurs when the plug-in electrified vehicle is running. While the vehicle is running, the grid-connected process 102 does not occur. That is, while the electrified vehicle is running, the AC source 110 does not provide or receive power to or from the battery 150.

In embodiments where a vehicle is a hybrid vehicle, the grid-connected process 102 occurs, for example, when a generator is driven by an engine of the hybrid vehicle. While the generator of the hybrid vehicle is generating energy, the stand-alone process 104 does not occur. That is, the battery 150 transfers no electric power to the electric motor/generator 180 while the generator of the hybrid vehicle is generating energy. The stand-alone process 104 occurs when the hybrid vehicle is running by the electric motor/generator 180. While the vehicle is running by the electric motor/generator 180, the grid-connected process 102 does not occur. That is, while the electrified vehicle is running by the electric motor/generator 180, the AC source 110 does not provide power to the battery 150. Because the grid-connected process 102 and the stand-alone process 104 do not occur at the same time, duplicative elements in the grid-connected process 102 and the stand-alone process 104 can be merged into a single unified element by sharing the same elements in the grid-connected process 102 and the stand-alone process 104.

Figure 2:
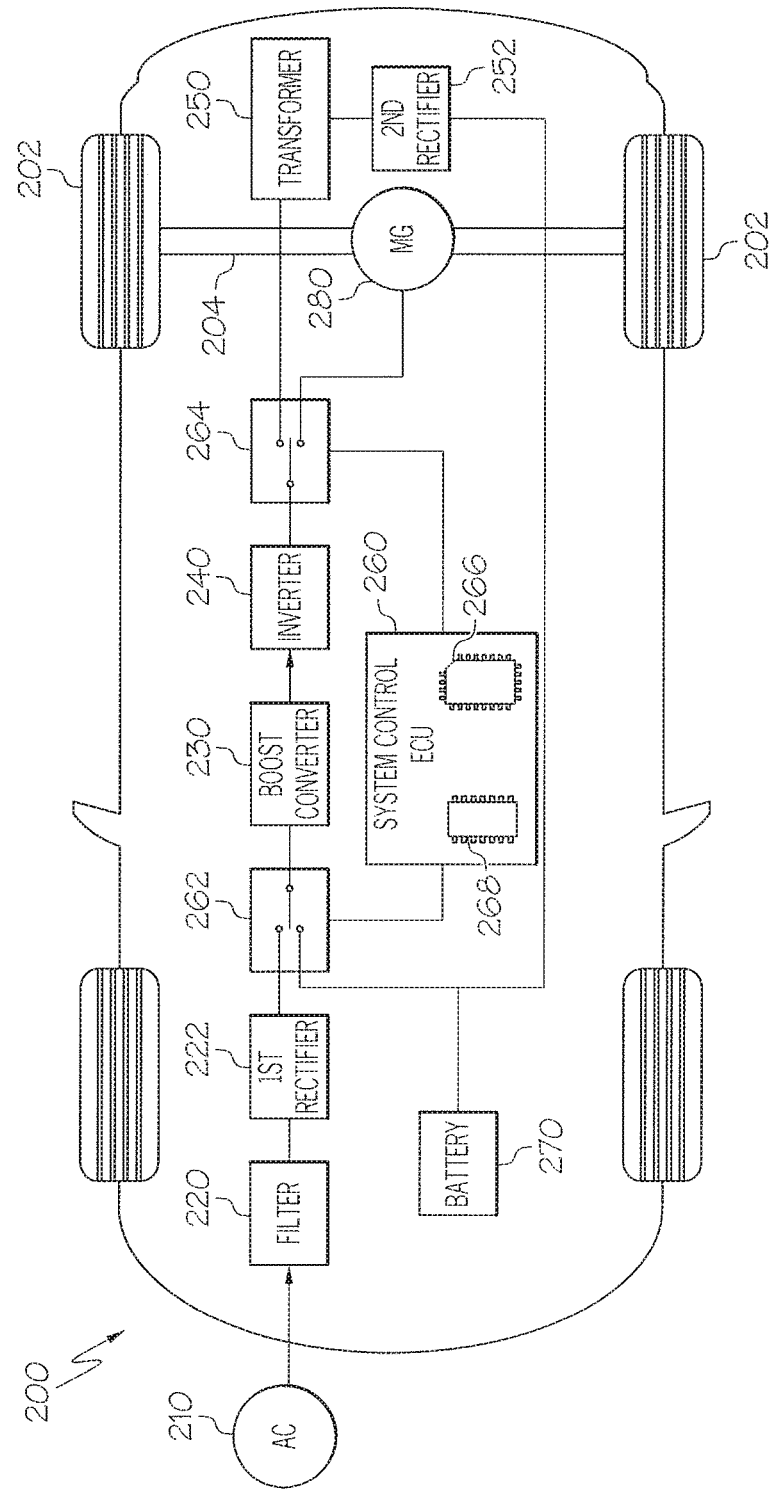
FIG. 2 depicts a schematic diagram of an example simplified power conversion system according to one or more embodiments shown and described herein.

Referring now to FIG. 2, a schematic diagram of an example simplified power conversion system 200 according to one or more embodiments is depicted. The simplified power conversion system 200 performs the same functionality as the power conversion system 100, but has a simplified structure that merges duplicative elements (e.g., the first boost converter 130 and the second boost converter 160 in the power conversion system 100 in FIG. 1A). The power conversion system 200 includes an AC source 210, a filter 220, a first rectifier 222, a first switch 262, a boost converter 230, an inverter 240, a second switch 264, a transformer 250, a second rectifier 252, a system control electronic control unit (ECU) 260, a battery 270, and an electric motor/generator 280.

In embodiments, the AC source 210 may be a grid which can be a single-phase or three-phase AC voltage. For example, the AC source 210 may be a wall outlet for an electrified vehicle or a plug-in type hybrid vehicle. In some embodiments, the AC source 210 may be a generator driven by the engine of a hybrid vehicle. In another embodiment, the AC source 210 may be a wireless charging device, and the power conversion system 200 may receive electric power form the AC source 210 wirelessly. Other AC sources are also possible. The filter 220 may include common-mode and differential mode filters for electromagnetic interference (EMI)/electromagnetic compatibility (EMC) requirements and the first rectifier 222 may include a diode rectifier. The boost converter 230 controls power factor and total harmonic distortion of AC current in the grid-connected mode. The boost converter 230 also steps up the rectified voltage to charge the battery 270 in the grid-connected mode, or steps down the voltage to process vehicle-to-grid power transfer in the grid-connected mode. The inverter 240 translates the DC voltage from the boost converter 230 into AC voltage to charge the battery 270 in the grid-connected mode. The inverter 240 also translates the AC voltage from the transformer 250 through the second switch 264 into DC voltage and feeds the DC voltage to the boost converter 230 for processing vehicle-to-grid power transfer in the grid-connected mode. The transformer 250 may be a transformer similar to the transformer included in the isolated DC-DC converter 140 in FIG. 1A, and the second rectifier 252 may be a rectifier similar to the rectifier included in the isolated DC-DC converter 140 in FIG. 1A. The details of circuit structure of the transformer 250 and the second rectifier 252 will be described below with reference to FIG. 6. The battery 270 is a battery pack constituted of a plurality of cells. In an example, the battery 270 may comprise a plurality of battery modules connected in series, where the battery modules are each made up of a plurality of cells integrated into the battery module. In a non-limiting example, the battery 270 may be a lithium ion battery. The electric motor/generator 280 is, for example, a synchronous motor generator, and connected to a drive shaft 204 coupled to drive wheels 202.

In a non-limiting example, the first switch 262 may be a single-pole double-throw (SPDT). As illustrated in FIG. 2, the first switch 262 is coupled to the first rectifier 222, the boost converter 230, and the battery 270. The first switch 262 is configured to selectively connect the boost converter 230 with the first rectifier 222 or the battery 270 in response to an instruction from the system control ECU 260. The second switch 264 is coupled to the inverter 240, the transformer 250, and the electric motor/generator 280. The second switch 264 is configured to selectively connect the inverter 240 with the transformer 250 or the electric motor/generator 280 in response to an instruction from the system control ECU 260.

The example system control ECU 260 is communicatively coupled to the first switch 262 and the second switch 264. The example system control ECU 260 includes a processor 266 and a non-transitory electronic memory 268. The processor 266 may be any device capable of executing machine readable instructions. Accordingly, the processor 266 may be a controller, an integrated circuit, a microchip, a computer, or any other computing device. The processor 266 is communicatively coupled to the other components of the power conversion system 200. For example, the processor 266 may receive data from an engine, a brake, or the electric motor/generator 280, and transmits signal to the first switch 262 and the second switch 264.

The non-transitory electronic memory 268 may comprise RAM, ROM, flash memories, hard drives, or any device capable of storing machine readable instructions such that the machine readable instructions can be accessed and executed by the processor 266. The machine readable instructions may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory electronic memory 268. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components The non-transitory electronic memory 268 may store computer readable and executable instructions that, when executed by the processor 266, causes the system control ECU 260 to determine whether the vehicle is in a grid-connected mode or a stand-alone mode. For example, if the processor 266 receives a signal indicating that the vehicle is in a parking mode and the ignition is off, the system control ECU 260 determines that the vehicle is in the grid-connected mode. In contrast, if the processor 266 receives a signal that the electric motor/generator 280 of the vehicle is running, the system control ECU 260 determines that the vehicle is in the stand-alone mode. As another example, if the processor 266 receives a signal that a regenerative brake of a hybrid vehicle is activated to generate electric power, the system control ECU 260 determines that the hybrid vehicle is in the stand-alone mode and charges the battery 270. If the processor 266 receives a signal that the hybrid vehicle is running by its electric motor, the system control ECU 260 determines that the hybrid vehicle is in the stand-alone mode and discharges the battery 270.

Figure 3:
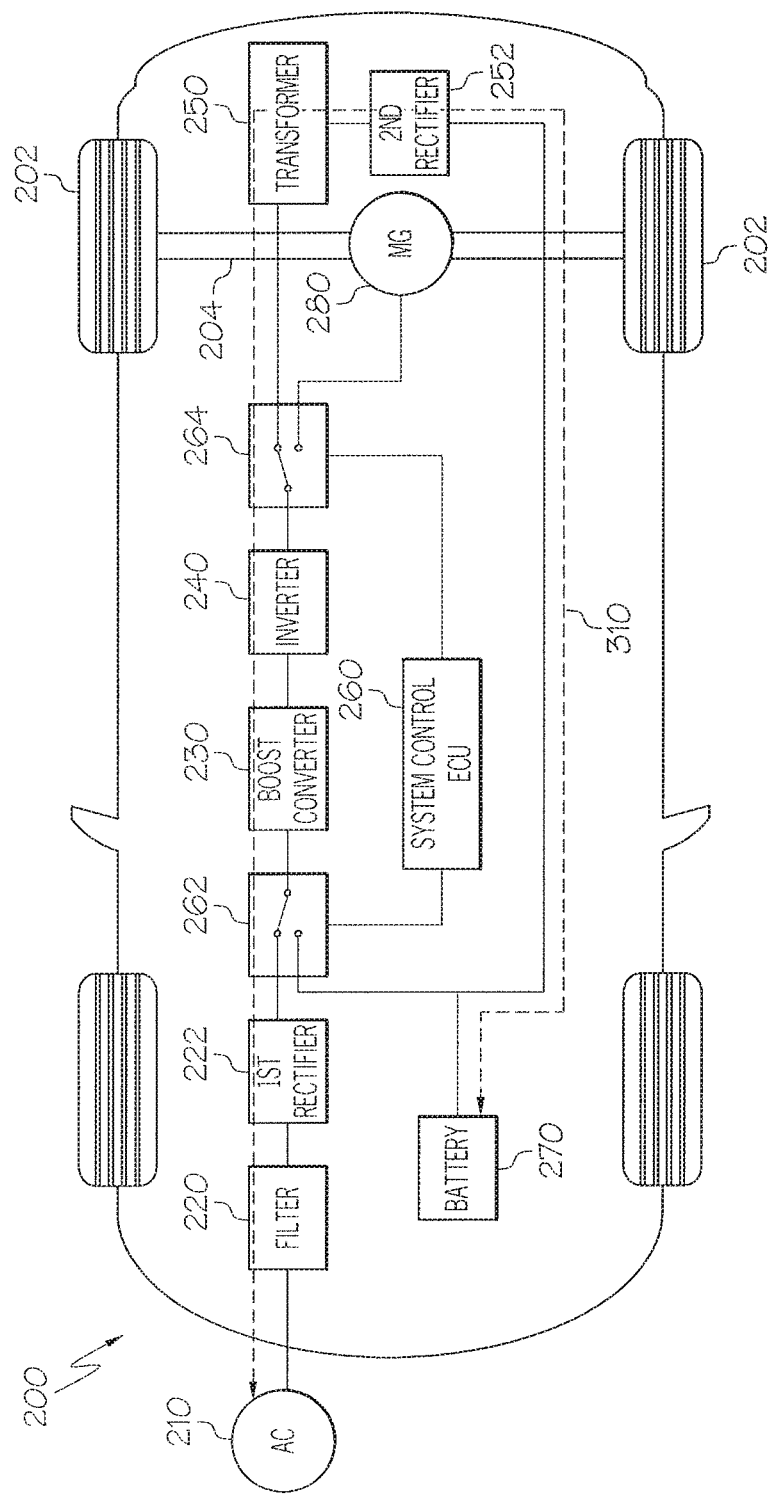
FIG. 3 depicts a schematic diagram of an example simplified power conversion system in a grid-connected mode according to one or more embodiments shown and described herein.

When it is determined that the vehicle is in the grid-connected mode, the system control ECU 260 instructs the first switch 262 to connect the first rectifier 222 with the boost converter 230 and instructs the second switch 264 to connect the inverter 240 with the transformer 250, as shown in FIG. 3. The dotted arrow 310 in FIG. 3 illustrates a flow of electric current when the vehicle is in the grid-connected mode. The dotted arrow 310 is comparable to the grid-connected process 102 in FIG. 1A. In the grid-connected mode with the battery 270 being charged, the AC source 210 provides an AC voltage to the filter 220. The filter 220 outputs filtered AC voltage to the first rectifier 222. The first rectifier 222 outputs a rectified voltage to the boost converter 230. The boost converter 230 controls the power factor and total harmonic distortion of the AC current received from the first rectifier 222 and steps up the rectified voltage. The combination of the inverter 240, the transformer 250, and the second rectifier 252 functions as an isolated DC-DC converter which converts the stepped-up rectified voltage into a refined DC voltage and feeds the refined DC voltage to the battery 270. In the grid-connected mode with the battery 270 being discharged, the second rectifier 252, the transformer 250, and the inverter 240 as an isolated DC-DC converter converts the DC voltage provided by the battery 270 and feeds the boost converter 230. The boost converter 230 generates rectified AC voltage and feeds the rectified AC voltage to the first rectifier 222 and the filter as a power conditioning device. The first rectifier 222 converts the rectified AC voltage into AC voltage and feeds the AC voltage to the AC source 210 through the filter 220.

Figure 4:
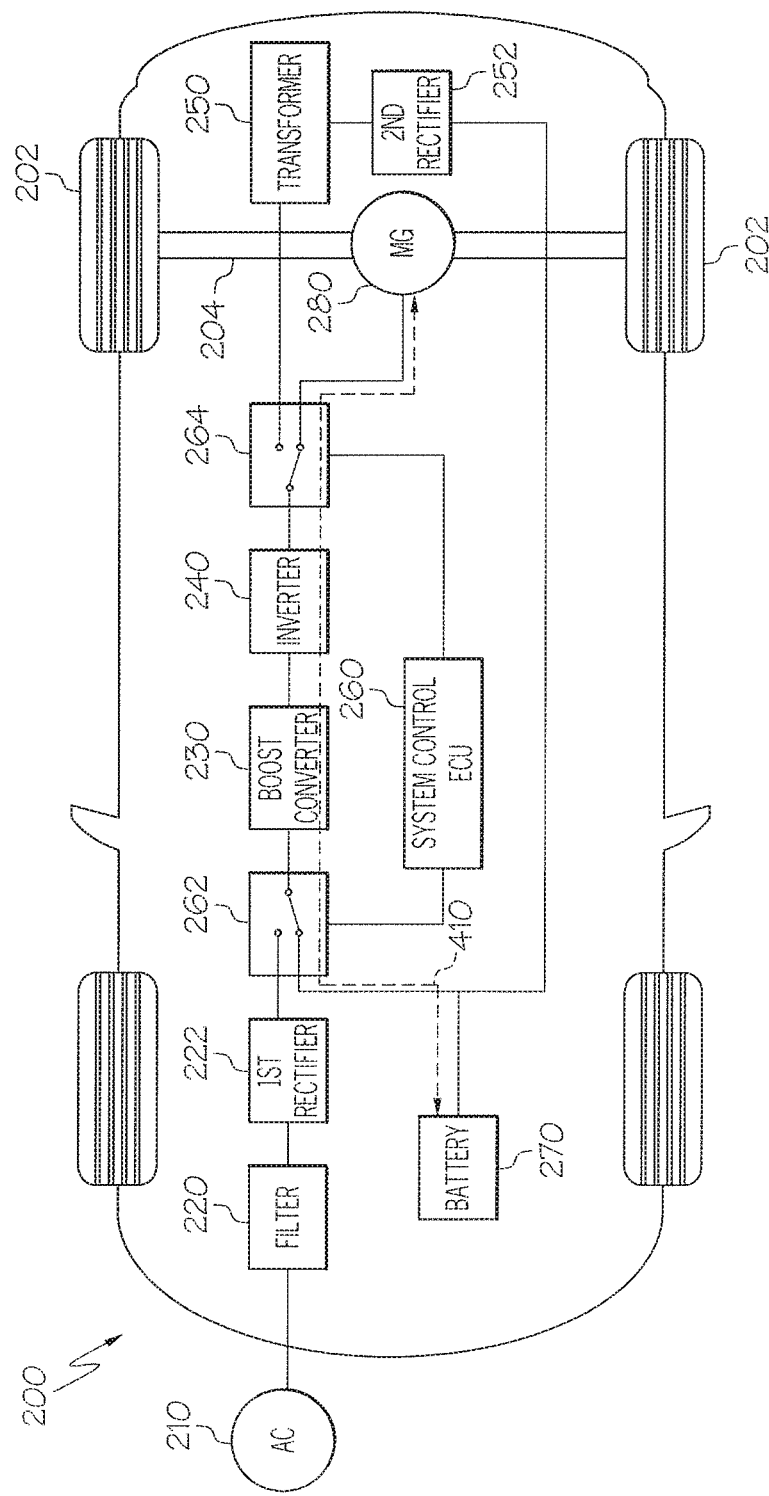
FIG. 4 depicts a schematic diagram of an example simplified power conversion system in a stand-alone mode according to one or more embodiments shown and described herein.

When it is determined that the vehicle is in the stand-alone mode, the system control ECU 260 instructs the first switch 262 to connect the boost converter 230 with the battery 270 and instructs the second switch 264 to connect the inverter 240 with the electric motor/generator 280, as shown in FIG. 4. The dotted arrow 410 in FIG. 4 illustrates a flow of electric current when the vehicle is in the stand-alone mode. The dotted arrow 410 is comparable to the stand-alone process 104 in FIG. 1B. In the stand-alone mode with the battery 270 being discharged, the battery 270 provides DC voltage to the boost converter 230. The boost converter 230 steps up the DC voltage provided by the battery 270 and provides the stepped-up DC voltage to the inverter 240. The inverter 240 translates the DC voltage into AC voltage and provides the AC voltage to the electric motor/generator 280. In the stand-alone mode with the battery 270 being charged, the electric motor/generator 280 generates AC voltage and feeds the inverter 240. The inverter 240 translates the AC voltage into DC voltage and feeds the DC voltage to the boost converter 230. The boost converter 230 steps down and refines the DC voltage and feeds the refined DC voltage to the battery 270.

As illustrated in FIGS. 3 and 4, the boost converter 230 and the inverter 240 are used both in the grid-connected mode and the stand-alone mode. The boost converter 230 functions as a power factor correction circuit when the vehicle is in the grid-connected mode, and functions as a DC-DC converter when the vehicle is in the stand-alone mode. The inverter 240 functions as a full bridge when the vehicle is in the grid-connected mode, and functions as a motor drive inverter when the vehicle is in the stand-alone mode.

The boost converter 230 and the inverter 240 may be designed for higher voltage/power ratings between the boost converter 230 and the inverter 240 operating in the grid-connected mode and the boost converter 230 and the inverter 240 operating in the stand-alone mode. For example, if the voltage ratings for the first boost converter 130 and the second boost converter 160 in FIG. 1A are 600 V and 1200 V, respectively, the boost converter 230 in FIG. 2 may be designed for 1200 V rating. This design enables the shared boost converter 230 to operate both in the grid-connected mode and the stand-alone mode. In addition, this design improves the lifetime of the shared circuit because the boost converter 230 experiences lower voltage/power than its rating, and thus is subject to less stress.

Because the boost converter 230 and the inverter 240 are shared for the grid-connected mode and the stand-alone mode, the number of electric components can be reduced. Particularly, compared with the schematic diagram in FIG. 1A, the schematic diagram in FIG. 2 includes a single boost converter instead of two boost converters. In addition, because the isolated DC-DC converter 140 in FIG. 1A has similar circuit structure as the inverter 170, the isolated DC-DC converter 140 is replaced by a combination of the inverter 240, the transformer 250, and the second rectifier 252 as shown in FIG. 2.

Figure 5:
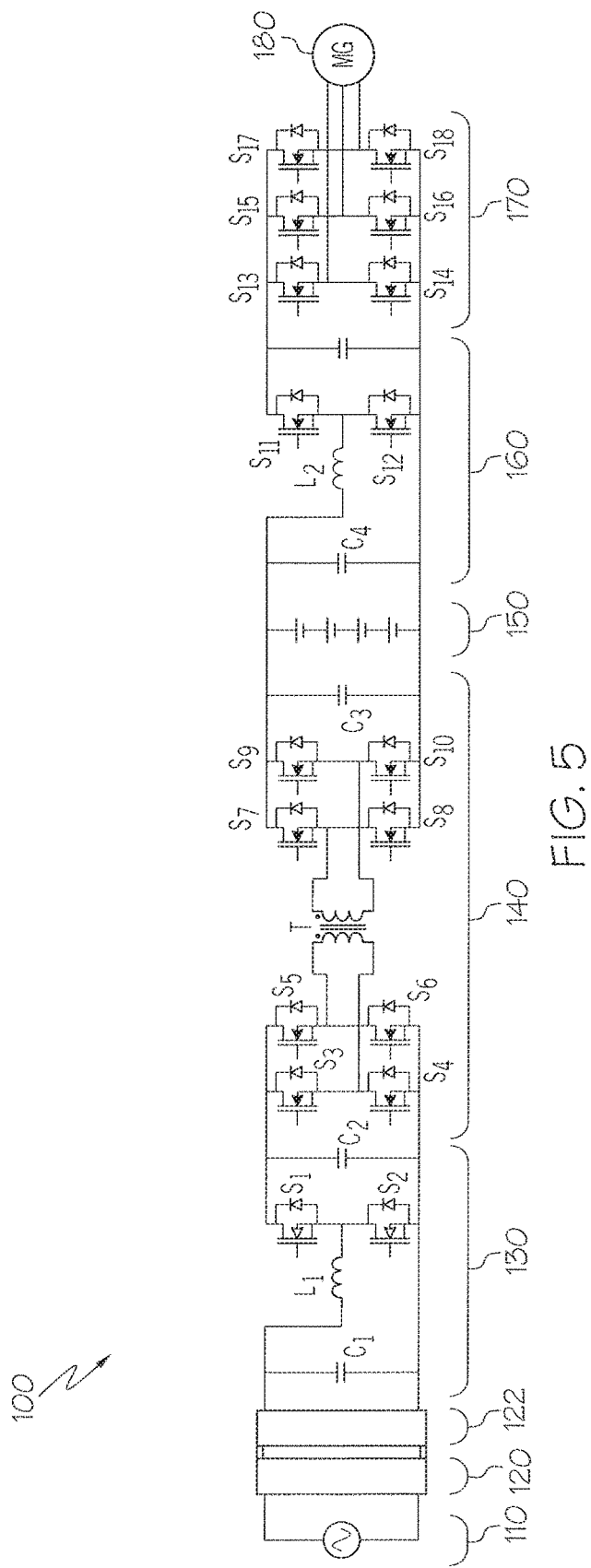
FIG. 5 depicts electric devices of the conventional power conversion system in FIG. 1A.

FIG. 5 depicts electric devices of each of the elements in the conventional power conversion system 100 in FIG. 1A. The first boost converter 130 includes two capacitors C1 and C2, one inductor L1, and two switches S1 and S2 as shown in FIG. 5. Although the switches S1 and S2 are illustrated as including a transistor and a diode, the switches S1 and S2 may be any type of semiconductor switches. One end of the capacitor C1 is connected to one end of the inductor L1 and the other end of the capacitor C1 is connected to one end of the switch S2. Two switches S1 and S2 are connected in series, and the other end of the inductor L1 is connected to a point between the switch S1 and the switch S2. The capacitor C2 is connected in parallel with the switch S1 and the switch S2 in series.

The isolated DC-DC converter 140 includes eight switches S3, S4, S5, S6, S7, S8, S9, and S10, one transformer T, and one capacitor C3 as shown in FIG. 5. The switch S3 and the switch S4 are connected in series. The switch S5 and the switch S6 are connected in series. The switch S7 and the switch S8 are connected in series. The switch S9 and the switch S10 are connected in series. The capacitor C2 of the first boost converter 130 is connected in parallel with the switch S3 and the switch S4. One end of the input port of the transformer T is connected to a point between the switch S5 and the switch S6. The other end of the input port of the transformer T is connected to a point between the switch S3 and the switch S4. One end of the output port of the transformer T is connected to a point between the switch S7 and the switch S8. The other end of the output port of the transformer T is connected to a point between the switch S9 and the switch S10. The capacitor C3 is connected in parallel with the switch S9 and the switch S10 in series. The isolated DC-DC converter 140 is connected in parallel with the battery 150 which is connected in parallel with the second boost converter 160.

The second boost converter 160 includes two capacitors C4 and C5, one inductor L2, and two switches S11 and S12 as shown in FIG. 5. One end of the capacitor C4 is connected to one end of the inductor L2, and the other end of the capacitor C4 is connected to one end of the switch S12. Two switches S11 and S12 are connected in series, and the other end of the inductor L2 is connected to a point between the switch S11 and the switch S12. The capacitor C5 is connected in parallel with the switch S11 and the switch S12 in series.

The inverter 170 includes six switches S13, S14, S15, S16, S17, and S18. The switch S13 and the switch S14 are connected in series. The switch S15 and the switch S16 are connected in series. The switch S17 and the switch S18 are connected in series. The electric motor/generator 180 is a three-phase motor. A first end of the electric motor/generator 180 is connected to a point between the switch S13 and the switch S14. A second end of the electric motor/generator 180 is connected to a point between the switch S15 and the switch S16. A third end of the electric motor/generator 180 is connected to a point between the switch S17 and the switch S18. Each of the switches S1 through S18 may consist of a diode and a transistor (e.g., MOSFET).

Figure 6:
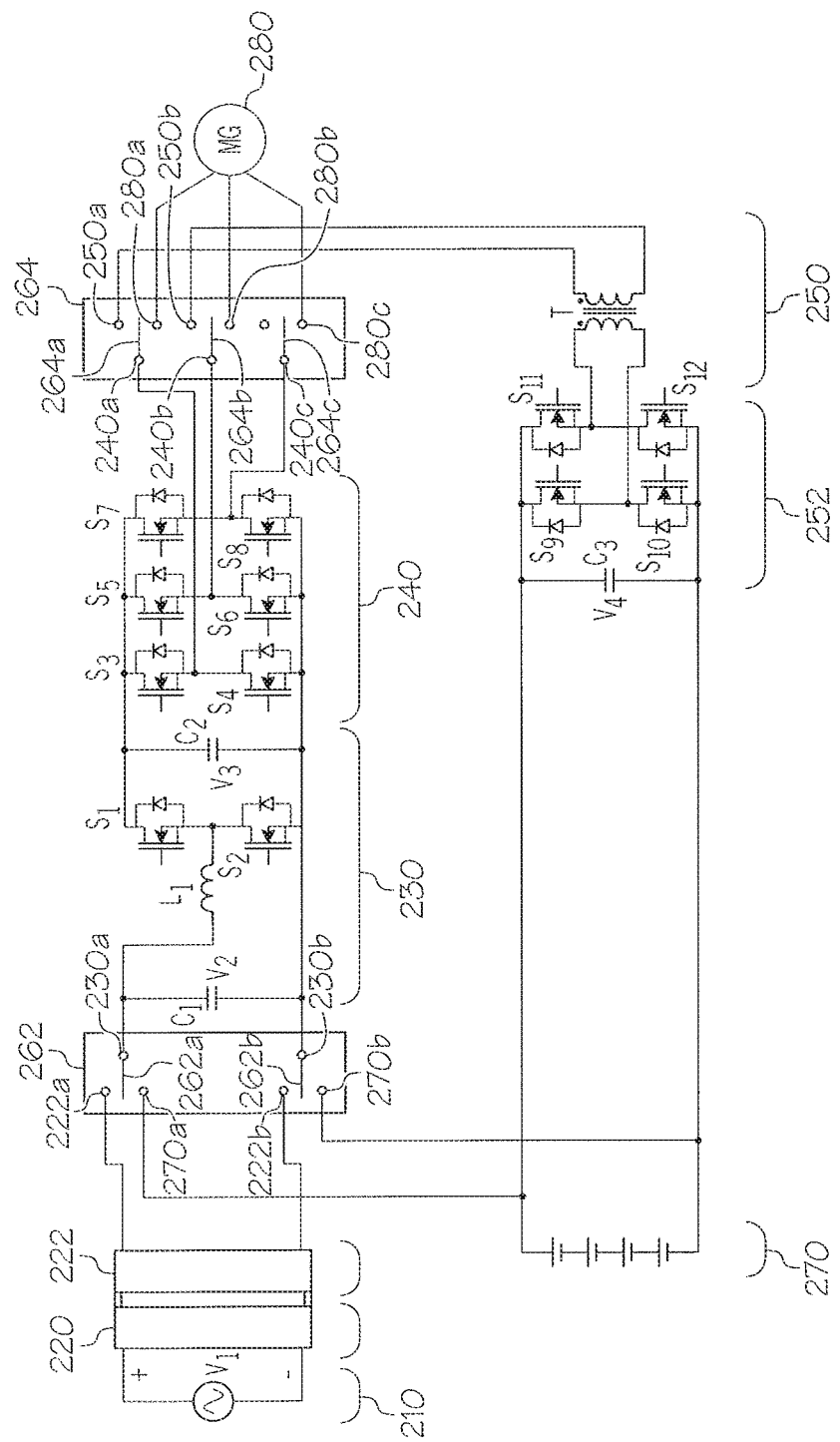
FIG. 6 depicts electric devices of the power conversion system in FIG. 2 according to one or more embodiments shown and described herein.

FIG. 6 depicts electric devices of each of the elements in the power conversion system 200 in FIG. 2. The AC source 210 is connected in parallel with the filter 220 and the first rectifier 222. Output ports of the first rectifier 222 are coupled to the input ports 222a and 222b of the first switch 262, respectively. Both ends of the battery 270 are coupled to input ports 270a and 270b of the first switch 262, respectively. The first rod 262a and the second rod 262b are connected to the input ports 230a and 230b of the boost converter 230, respectively. The first rod 262a is connected to either the input port 222a of the first switch 262 or the input port 270a of the first switch 262 based on whether the vehicle is in the grid-connected mode or the stand-alone mode. The second rod 262b is connected to either the input port 222b of the first switch 262 or the input port 270b of the first switch 262 based on whether the vehicle is in the grid-connected mode or the stand-alone mode.

The boost converter 230 includes two capacitors C1 and C2, one inductor L1, and two switches S1 and S2 as shown in FIG. 6. One end of the capacitor C1 is connected to one end of the inductor L1 and the other end of the capacitor C1 is connected to one end of the switch S2. Two switches S1 and S2 are connected in series, and the other end of the inductor L1 is connected to a point between the switch S1 and the switch S2. The capacitor C2 is connected in parallel with the switch S1 and the switch S2 in series.

The inverter 240 includes six switches S3, S4, S5, S6, S7, and S8. The switch S3 and the switch S4 are connected in series. The switch S5 and the switch S6 are connected in series. The switch S7 and the switch S8 are connected in series. The second switch 264 includes first, second and third input ports 240a, 240b, and 240c. The first input port 240a is connected to a point between the switch S3 and the switch S4. The second input port 240b is connected to a point between the switch S5 and the switch S6. The third input port 240c is connected to a point between the switch S7 and the switch S8. First, second, and third rods 264a, 264b, and 264c are connected to the first, second, and third input ports 240a, 240b, and 240c, respectively. The first rod 264a is connected to either an input port 250a of the transformer T or the first input port 280a of the electric motor/generator 280 based on whether the vehicle is in the grid-connected mode or the stand-alone mode. The second rod 264b is connected to either the other input port 250b of the transformer T or the second input port 280b of the electric motor/generator 280 based on whether the vehicle is in the grid-connected mode or the stand-alone mode. The third rod 264c is connected to the third input port 280c of the electric motor/generator 280 or connected to nothing based on whether the vehicle is in the grid-connected mode or the stand-alone mode. The rods 262a, 262b, 264a, 264b, and 264c may operate synchronously. For example, when the vehicle is in the grid-connected mode, the rods 262a, 262b, 264a, and 264b are simultaneously connected to the ports 222a, 222b, 250a, and 250b, respectively, and when the vehicle is in the stand-alone mode, the rods 262a, 262b, 264a, 264b, and 264c are simultaneously connected to the ports 270a, 270b, 280a, 280b, and 280c, respectively.

The transformer 250 includes the transformer T similar to the transformer T of the isolated DC-DC converter 140 in FIG. 5. The second rectifier 252 includes four switches S9, S10, S11, and S12, one transformer T, and one capacitor C3 as shown in FIG. 6. The switch S9 and the switch S10 are connected in series. The switch S11 and the switch S12 are connected in series. The capacitor C3 is connected in parallel with the switch S9 and the switch S10. One end of the output port of the transformer T is connected to a point between the switch S11 and the switch S12. The other end of the output port of the transformer T is connected to a point between the switch S9 and the switch S10.

The boost converter 230, the inverter 240, the transformer 250, and the rectifier 252 in FIG. 6 include a total of twelve (12) switches, three capacitors, one inductor, and one transformer. In contrast, the first boost converter 130, the isolated DC-DC converter 140, the second boost converter 160, and the inverter 170 in FIG. 5 include a total of eighteen (18) switches, five capacitors, two inductors, and one transformer. Thus, the power conversion system 200 in FIG. 6 includes six less switches, two less capacitors, and one less inductor than the power conversion system 100 in FIG. 5. Because the present power conversion system includes less electronic devices, e.g., switches, capacitors and inductors, it provides a vehicle having a more compact and lighter power conversion system than other power conversion systems.

By sharing redundant power conversion stages and eliminating duplicative electronic devices, the power conversion system according to the present disclosure reduces the volume and weight of the power architecture for the vehicle. The present power conversion system shares more than one converter to enhance energy efficiency, reliability and drive range of the vehicle. Although the present disclosure describes merging two boost converters into one boost converter and two inverters into one inverter, any additional duplicative converters (e.g., buck converters, buck-boost converters, forward converters, flyback converters, half-bridge converters, full-bridge converters, etc.) in a charging path and a discharging path of the power conversion system may be merged into a single converter or inverter.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A power conversion system for a vehicle, the power conversion system comprising:
    a power conditioning device;
    a boost converter;
    an inverter coupled to the boost converter;
    a transformer;
    a second rectifier coupled to the transformer;
    an electric motor;
    a battery coupled to the second rectifier;
    a first switch configured to selectively connect the boost converter with the power conditioning device or the battery; and
    a second switch configured to selectively connect the inverter with the transformer or the electric motor, wherein
    the first switch connects the power conditioning device with the boost converter and the second switch connects the inverter with the transformer in response to the vehicle being in a grid-connected mode, and
    the first switch connects the battery with the boost converter and the second switch connects the inverter with the electric motor in response to the vehicle being in a stand-alone mode.

2. The power conversion system of claim 1, wherein the first switch and the second switch are single-pole double-throw (SPDT) switches.

3. The power conversion system of claim 1, further comprising a system control electronic control unit configured to:
    determine whether the vehicle is in the grid-connected mode or in the stand-alone mode; and
    control the first switch and the second switch based on the determination.

4. The power conversion system of claim 3, wherein the system control electronic control unit is configured to determine that the vehicle is in the grid-connected mode when the vehicle is parked and determine that the vehicle is in the stand-alone mode when the vehicle is running.

5. The power conversion system of claim 1, wherein the power conditioning device comprises: a filter; and
    a first rectifier coupled to the filter.

6. The power conversion system of claim 1, wherein the vehicle is an electrified vehicle, and the power conditioning device is configured to receive AC voltage from an external source.

7. The power conversion system of claim 1, wherein the vehicle is a hybrid vehicle, and the power conditioning device is configured to receive AC voltage from a generator of the vehicle.

8. The power conversion system of claim 5, wherein the first rectifier and the second rectifier includes a diode rectifier bridge including four switches.

9. The power conversion system of claim 1, wherein the inverter includes six switches.

10. The power conversion system of claim 1, wherein the boost converter is configured to control power factor and total harmonic distortion of AC current provided to the power conditioning device.

11. The power conversion system of claim 1, wherein the power conditioning device is configured to receive AC voltage wirelessly from a wireless charging device.

12. The power conversion system of claim 1, wherein a series connection of the inverter, the transformer and the second rectifier constitutes a DC-DC converter.

13. A method of controlling a power conversion system of a vehicle, the power conversion system comprising:
a power conditioning device;
a boost converter;
an inverter coupled to the boost converter;
a transformer;
a second rectifier coupled to the transformer;
an electric motor;
a battery coupled to the second rectifier;
a first switch;
a second switch; and
a system control electronic control unit communicatively coupled to the first switch and the second switch,
the method comprising:
determining, by the system control electronic control unit, whether the vehicle is in a grid-connected mode or a stand-alone mode;
in response to the vehicle being in the grid-connected mode:
operating the first switch to connect the power conditioning device of the power conversion system with the boost converter of the power conversion system; and
operating the second switch to connect the inverter of the power conversion system with the transformer of the power conversion system; and
in response to the vehicle being in the stand-alone mode:
operating the first switch to connect the battery of the power conversion system with the boost converter; and
operating the second switch to connect the inverter with the electric motor of the power conversion system.

14. The method of claim 13, wherein the first switch and the second switch are single-pole double-throw (SPDT) switches.

15. The method of claim 13, wherein the system control electronic control unit is configured to determine that the vehicle is in the grid-connected mode when the vehicle is parked and determine that the vehicle is in the stand-alone mode when the vehicle is running.

16. A vehicle including a power conversion system, the power conversion system comprising:
a power conditioning device;
a boost converter;
an inverter coupled to the boost converter;
a transformer;
a second rectifier coupled to the transformer;
an electric motor;
a battery coupled to the second rectifier;
a first switch configured to selectively connect the boost converter with the power conditioning device or the battery; and
a second switch configured to selectively connect the inverter with the transformer or the electric motor, wherein
the first switch connects the power conditioning device with the boost converter and the second switch connects the inverter with the transformer in response to the vehicle being in a grid-connected mode, and
the first switch connects the battery with the boost converter and the second switch connects the inverter with the electric motor in response to the vehicle being in a stand-alone mode.

17. The vehicle of claim 16, wherein the first switch and the second switch are single-pole double-throw (SPDT) switches.

18. The vehicle of claim 16, wherein the power conversion system comprises a control electronic control unit configured to:
determine whether the vehicle is in the grid-connected mode or in the stand-alone mode; and
control the first switch and the second switch based on the determination.

19. The vehicle of claim 16, wherein the system control electronic control unit is configured to determine that the vehicle is in the grid-connected mode when the vehicle is parked and determine that the vehicle is in the stand-alone mode when the vehicle is running.

20. The vehicle of claim 16, wherein a series connection of the inverter, the transformer and the second rectifier constitutes a DC-DC converter.

* * * * *